United States Patent [19]  
Hamilton et al.

[11] Patent Number: 5,271,773  
[45] Date of Patent: Dec. 21, 1993

[54] PROCESS FOR CLEANING ARTICLES WITH AN AQUEOUS SOLUTION OF TERPENE AND RECYCLE WATER AFTER SEPARATION

[75] Inventors: C. Richard Hamilton, Arvada; Ross M. Gustafson, Golden, both of Colo.

[73] Assignee: Golden Technologies Company, Inc., Golden, Colo.

[21] Appl. No.: 896,404

[22] Filed: Jun. 10, 1992

Related U.S. Application Data

[63] Continuation-in-part of Ser. No. 849,424, filed as PCT/US91/09310 on Dec. 6, 1991, Pat. No. 5,248,343, and continuation-in-part at Ser. No. 624,140, Dec. 7, 1990, abandoned.

[51] Int. Cl.$^5$ .......................... B08B 7/04; C11D 7/24; C23G 5/024
[52] U.S. Cl. ......................... 134/10; 134/26; 134/40; 252/162; 252/171
[58] Field of Search ............... 134/2, 10, 22.14, 22.19, 134/25.4, 26, 40; 252/162, 171, 174.2, DIG. 14; 413/1, 2, 8; 427/327, 353

[56] References Cited

U.S. PATENT DOCUMENTS

| Re. 29,649 | 5/1978 | Farnsworth | 252/171 |
|---|---|---|---|
| Re. 32,661 | 5/1988 | Binns | 252/142 |
| 2,711,978 | 6/1955 | Groom | 134/10 |
| 2,923,648 | 2/1960 | K'Burg | 134/12 |
| 3,023,144 | 2/1962 | Greathouse et al. | 167/58 |
| 3,025,190 | 3/1962 | Groom et al. | 134/10 |
| 3,094,469 | 6/1963 | Strauss et al. | 204/141 |
| 3,450,086 | 6/1969 | Maddock | 114/74 |
| 3,548,543 | 12/1970 | Evans et al. | 51/8 |
| 3,634,338 | 1/1972 | Laugle et al. | 252/525 |
| 3,951,682 | 4/1976 | Schevey et al. | 134/102 |
| 3,964,936 | 6/1976 | Das | 148/6.27 |
| 3,969,135 | 7/1976 | King et al. | 134/41 |
| 4,009,115 | 2/1977 | Binns | 252/142 |
| 4,082,867 | 4/1978 | Henley et al. | 427/327 |
| 4,091,954 | 5/1978 | Wallace | 220/470 |
| 4,136,217 | 1/1979 | Henley et al. | 427/327 |
| 4,270,957 | 6/1981 | Donakowski et al. | 134/2 |
| 4,336,152 | 6/1982 | Like et al. | 252/106 |
| 4,362,638 | 12/1982 | Caskey et al. | 252/90 |
| 4,379,168 | 4/1983 | Dotolo | 424/356 |
| 4,414,128 | 11/1983 | Goffinet | 252/111 |
| 4,445,813 | 5/1984 | Misra et al. | 413/1 |
| 4,452,264 | 6/1984 | Kreisel et al. | 134/58 |
| 4,477,290 | 10/1984 | Carroll et al. | 148/6 |
| 4,498,934 | 2/1985 | Potts | 134/254 |
| 4,506,533 | 3/1985 | Hessel et al. | 72/42 |
| 4,511,488 | 4/1985 | Matta | 252/162 |
| 4,537,640 | 8/1985 | Kreisel et al. | 134/18 |
| 4,540,505 | 9/1985 | Frazier | 252/106 |
| 4,599,116 | 7/1986 | King et al. | 134/2 |
| 4,620,937 | 11/1986 | Dellutri | 252/143 |
| 4,640,719 | 2/1987 | Hayes et al. | 134/40 |
| 4,654,089 | 3/1987 | Singelyn et al. | 134/26 |
| 4,704,225 | 11/1987 | Stoufer | 252/153 |
| 4,749,516 | 6/1988 | Bursky | 252/546 |
| 4,767,563 | 8/1988 | de Buzzaccarini | 252/174 |
| 4,790,951 | 12/1988 | Frieser et al. | 252/162 |
| 4,797,231 | 1/1989 | Schumann et al. | 252/547 |
| 4,798,218 | 1/1989 | Sauvan | 134/74 |
| 4,865,742 | 9/1989 | Falletti | 210/637 |

FOREIGN PATENT DOCUMENTS 1603047 11/1981 United Kingdom .

Primary Examiner—Theodore Morris  
Assistant Examiner—Saeed T. Chaudhry  
Attorney, Agent, or Firm—Sheridan Ross & McIntosh

[57] ABSTRACT

Disclosed is a composition and process for cleaning articles contaminated with water insoluble contaminants. The process allows for efficient recycling of components in the system. The wash solution effectively cleans water insoluble contaminants and, upon settling, quickly releases contaminants from the wash solution. In this manner, the wash solution and components of it can be readily recycled. The composition of the present invention includes between about 1.86 volume percent and about 37.2 volume percent terpene, preferably d-limonene, and between about 0.14 volume percent and about 2.8 volume percent surfactant.

19 Claims, 1 Drawing Sheet

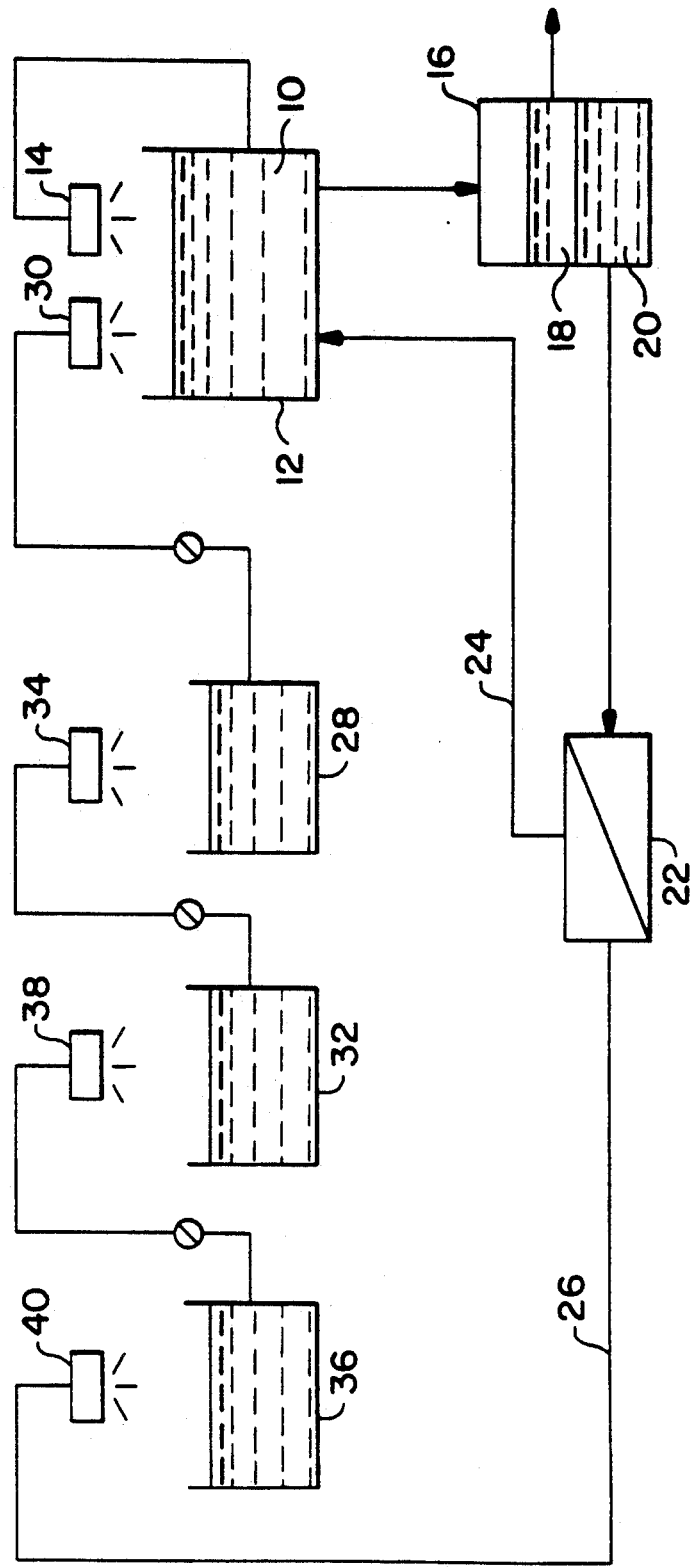
FIG. I

PROCESS FOR CLEANING ARTICLES WITH AN AQUEOUS SOLUTION OF TERPENE AND RECYCLE WATER AFTER SEPARATION

REFERENCE TO RELATED APPLICATIONS

This application is a continuation-in-part of co-pending U.S. application Ser. No. 07/849,424 now U.S. Pat. No. 5,248,343 which is a national phase of Patent Cooperation Treaty Application Ser. No. US 91/09310 filed Dec. 6, 1991 having priority based upon co-pending U.S. application Ser. No. 07/624,140 filed Dec. 7, 1990 now abandoned. All of the preceding patent applications are incorporated herein by reference.

FIELD OF THE INVENTION

This invention relates to a process and composition for cleaning water insoluble contaminants from articles. More particularly, the process and composition of the present invention relate to such systems which further involve the recycling of various liquid streams.

BACKGROUND OF THE INVENTION

In the manufacture of articles, such as metal articles, it is common for oil-based compositions to be used as lubricants and/or coolants during the manufacturing process. It is frequently necessary to clean such manufactured articles of the oil-based compositions prior to subsequent steps, such as coating or decorating surfaces of the article.

Commonly, such manufacturing oils are cleaned with either acidic or caustic solutions and subsequently rinsed with water for cleaning. Such cleaning processes have a number of disadvantages, including hazards in handling acidic or caustic solutions, the need for treatment of used wash solutions for compliance with environmental regulations prior to discharge of the used solutions and damage to the articles being cleaned.

It has been recognized in related applications that terpene-based cleaning compositions are particularly advantageous for cleaning oil-based compositions in the manufacture of articles. For example, in specific processes, such as the manufacture of cans, it has been found in the present invention that terpene-based cleaning compositions cause significantly less etching when compared with acidic or caustic wash solutions. Such reduced etching results in highly improved reflectivity of containers, increased mobility of articles on conveyor lines, and also allows for the recycle of various liquid streams in the cleaning system.

A problem encountered in terpene-based cleaning systems is that to recycle the cleaning solution, contaminants which have been removed from articles must be separated from the contaminated cleaning solution prior to recycling of the cleaning solution. However, it has been found that many terpene-based compositions do not allow for effective separation or release of contaminants, at least not quickly enough for most commercial manufacturing processes. For example, U.S. Pat. No. 4,511,488 (Matta 1985) discloses a d-limonene-based composition having between 10 and 60 volume percent d-limonene and between 10 and 30 volume percent surfactant. It has been found that compositions having surfactant levels in this range do not provide adequate releasability of contaminants for a suitable recycling process.

Thus, there is a need for an improved terpene-based cleaning process and composition which provides for effective cleaning, easy release of contaminants and improved recycling of liquid streams in a cleaning process.

SUMMARY OF THE INVENTION

The present invention includes a process which comprises contacting an article contaminated with water insoluble contaminants with an aqueous cleaning solution. The solution includes between about 1.86 volume percent and about 37.2 volume percent of a terpene and between about 0.14 volume percent and about 2.8 volume percent of a surfactant. The process further includes allowing contaminants which have been washed from the article with the aqueous solution to separate from the aqueous solution. The process further includes recycling a portion of the aqueous solution from which contaminants have been separated. The entire aqueous solution, or a portion which has been filtered, can be recycled into the wash solution for further contacting contaminated articles. Alternatively, or in addition to such a recycle stream, the water in the aqueous solution from which contaminants have been separated can be recycled to rinse articles that have been cleaned by contacting them with the wash solution. The process is preferably conducted as a continuous process.

The terpene in the cleaning solution is preferably d-limonene. The surfactants can be selected from nonylphenol, alkanolamide, (nonylphenoxy)polyethylene oxide, sodium salts of petroleum sulfonic acid, sorbitan sesquioleate, or mixtures thereof. Preferably, the ratio of surfactant to terpene is less than about 9.5:90.5.

The present invention also includes effective compositions used in the process.

The present process and composition provide a process for cleaning water insoluble contaminants from articles which allows for efficient recycling of liquid streams involved in the process. The cleaning composition effectively cleans contaminants from articles and also allows for effective release of contaminants from the wash solution. In this manner the wash solution, or portions of the wash solution, can be readily recycled.

BRIEF DESCRIPTION OF THE FIGURES

FIG. 1 is a schematic flow diagram showing the application of wash and rinse solutions and the flow of such solutions and waste solutions therefrom through the washing, rinsing, filtering, and reclaim stages of the present invention.

DETAILED DESCRIPTION OF THE INVENTION

The present process and composition are particularly suitable for efficiently cleaning articles contaminated with water insoluble contaminants. The process includes contacting the contaminated article with an aqueous solution comprising a terpene and surfactant. The aqueous solution is formulated such that effective cleaning is achieved and quick release of contaminants is obtained to allow for subsequent recycle of the aqueous solution.

The present invention generally relates to a method for cleaning articles. As used herein, articles refers to any feedstock, goods in process, or finished products. Such articles can be made of any material including, without limitation, metal, ceramic, fiberglass, plastic and wood. Metal articles can include, but are not limited to, any article having a metal surface, including aluminum, steel, brass, copper or alloys thereof, such as parts of automobiles, airplanes, railroad cars, metal components used in high technology industries, computer and calculator face plates, containers, precision metal parts, shiny metal components (e.g. doorknobs), and other manufactured metal articles. The term container, as used herein, refers to, but is not limited to, beverage cans, food containers and other containers such as aerosol cans and oil filters.

The present process and composition are particularly useful for articles having metal parts which are thin, such as metal parts which are less than about 0.010", more preferably less than about 0.0070", and even more preferably less than about 0.0040". Such thin metal parts, if etched by conventional acid or caustic wash solutions, can have holes etched completely through the metal parts. The present process and composition are also particularly suitable for use in conjunction with metals which are susceptible to etching by typical cleaning solutions such as acidic or caustic washing solutions. In particular, aluminum, including treated aluminum, magnesium, including treated magnesium, tin-free steel, steel, copper and copper alloys are particularly susceptible to etching. Further, the present process and composition are particularly suitable for use in cleaning articles which are manufactured by any type of drawing process in which metal starting material is shaped by drawing the metal with various forming parts such as a die. Such drawn surfaces are particularly susceptible to etching because they may undergo gouging during the drawing process which provides a site for etching to occur.

Contaminants refers to any water insoluble organic substance, particularly a petroleum-based or synthetic organic compound, that is deposited on an article's surface during industrial processes. As used herein, water insoluble substances refers to any substance that is not substantially dispersible in water at the molecular or ionic level. Such water insoluble substances are therefore not effectively removed from a surface by water. Contaminants typically will be lubricants and/or coolants, such as forming oils, cutting oils, mill oils, and anti-rust oils, which are commonly composed of petroleum products, esters, diesters and/or fatty acids. Preferred contaminants in the present invention are synthetic in origin including polyglycols, fatty acids, ethers including polyphenyl ethers, and esters including diesters, triesters and tetraesters and including phosphate esters, dibasic acid esters, silicate esters, and neopentyl polyol esters. Contaminants are commonly emulsions of an oil in water (oil is a dispersed phase in a continuous phase of water), typically having oil concentrations in the range of about 5 volume percent to about 25 volume percent. Metal coil stock for making metal articles, such as containers, for example, is frequently contacted with a number of compositions to lubricate the surface of the metal and to reduce the temperature in the metal.

Preferred contaminants are contaminants having a well-defined lower molecular weight value such that a molecular weight distribution of the contaminants does not go substantially below a given molecular weight. In this manner, effective filtration of system components can be achieved, as discussed below. Thus, preferred contaminants include synthetic oils having a well-defined molecular weight range or petroleum-based oils having a well-defined molecular weight fraction. In a preferred embodiment, the contaminant is an oil with a molecular weight of at least about 300 and more preferably above about 500. In a preferred embodiment of the invention, the contaminant comprises a petroleum fraction having a minimum chain length of 20 carbon atoms, more preferably a minimum chain length of 35 carbon atoms, and more preferably a minimum chain length of 50 carbon atoms. A preferred contaminant includes a tetraester such as a tetraester formed from the esterification of 10–30 carbon chain saturated fatty acids with pentaerythritol. For example, a preferred contaminant includes a tetraester such as in an amount of about 86 volume percent, S-MAZ80 in an amount of about 6 volume percent, BRIJ-30 in an amount of about 4 volume percent, Mazon 224-86 in an amount of about 2 volume percent, and Mazon RI6 in an amount of about 2 volume percent. S-MAZ80, BRIJ-30 and Mazon 224-86 are surfactants and emulsifying agents available from Mazur Chemical. Mazon RI6 is a rust inhibitor available from Mazur Chemical.

Contaminants having a low molecular weight or a broad molecular weight distribution including low molecular weight species can pass through the pores in certain filters such as cross-flow filters resulting in poor filtration of water. In contrast, preferred contaminants having a well-defined lower molecular weight value greater than the relevant pore size typically will not pass through the pores in a filter. As used herein, cross-flow filter refers to a device which separates components in a pressurized feed stream moving parallel to a filter membrane. In cross-flow filtration, molecules below a desired size pass through the membrane walls. Molecules above a desired size are substantially incapable of passing through the membrane walls and pass through the filter.

The composition of the present invention which is used as the aqueous solution in the present process comprises a terpene or terpene mixture in an amount effective for particular cleaning applications. Terpenes have the general chemical formula of $C_{10}H_{16}$ and are based on the isoprene unit $C_5H_8$. The term terpene includes terpene derivatives or terpenoids as well as monocyclic, bicyclic, polycyclic or acyclic terpenes. Preferred terpene compositions of the present invention include d-limonene, alpha-terpineol, beta-terpineol, alpha-pinene, beta-pinene, alcohols of such compositions, or mixtures thereof.

The concentration of terpene in the present composition depends upon the particular application and generally is effective to obtain acceptable cleaning levels of contaminants from articles, as well as, in combination with surfactants in the composition, to obtain acceptable separation as discussed in more detail below. More particularly, the concentration of terpene is between about 1.86 volume percent and about 37.2 volume percent, more preferably between about 4.65 volume percent and about 27.9 volume percent, and more preferably between about 9.3 volume percent and about 23.25 volume percent, based on the total volume of the aqueous solution.

The composition of the present invention also includes, as a component, surfactants. The surfactants are used in conjunction with the terpene to facilitate rapid wetting of the surface of the article and for emulsification of organic components with water. Any suitable surfactant or mixtures of surfactants can be used and they can be non-ionic, anionic, cationic, or amphoteric, and of natural or synthetic origin. Suitable surfactants for use in the present invention include, but are not limited to, nonylphenol, alkanolamide, (nonylphenoxy)- polyethylene oxide, sodium salts of petroleum sulfonic acid, sorbitan sesquioleate, or mixtures thereof. Specific suitable surfactants include surfactants sold under the commercial designation Tergitol NP-7 sold by Union Carbide Corporation and WRS-1-66 sold by Cyclo-Corporation of Miami, Fla. Tergitol NP-7 is a nonionic nonylphenol with an ethoxylated seven carbon chain. WRS-1-66 is a nonionic alkynolamide consisting of oleic acid DEA and DEA oleate.

The concentration of surfactant in the composition is such as to achieve a stable aqueous solution of the terpene and water, acceptable cleaning of articles, and acceptable separation of contaminants from the aqueous solution, as discussed below. Typically, the concentration of surfactant in the composition is between about 0.14 volume percent and about 2.8 volume percent, more preferably between about 0.35 volume percent and about 2.1 volume percent, and more preferably between about 0.7 volume of the aqueous solution. In a preferred embodiment, the composition includes Tergitol NP-7 or a similar composition in a concentration of between about, 0.12 volume percent and about 2.4 volume percent based on total volume of the aqueous solution, and WRS-1-66 or a similar composition in a concentration of between about 0.02 volume percent and about 0.4 volume percent based on total volume of the aqueous solution.

A further characteristic of the present invention is the ratio of surfactant to terpene in the aqueous solution. This ratio is a measure of the stability of the terpene and water emulsion in the aqueous solution and the ability of the aqueous solution to allow contaminants to separate after cleaning. Typically the ratio of surfactant to terpene is less than about 9.5:90.5, more preferably between about 5:95 and about 8:92, and most preferably about 7:93.

The aqueous solution, in addition to terpene and surfactant, also includes water as the continuous phase. Typically, water is present in amounts between about 60 volume percent and about 98 volume percent, more preferably between about 70 volume percent and about 95 volume percent, and more preferably between about 75 volume percent and about 90 volume percent.

The process of the present invention includes contacting an article contaminated with water insoluble contaminants with an aqueous solution, as those terms are broadly described above. Any conventional technique may be employed to contact the aqueous solution with the contaminated article. For example, contact can be accomplished by spraying, showering or immersing the article in the aqueous solution. Appropriate contacting times, pressures, and aqueous solution volumes can be determined for particular applications. In a preferred embodiment, the present process is conducted as part of a continuous manufacturing process for the manufacture of the articles, for example, in the continuous manufacture of aluminum containers. In such a process, the articles are continuously conveyed through a contacting zone.

As the articles are contacted with the aqueous solution, the aqueous solution is allowed to drain from the contacted articles and is collected in a reservoir. The reservoir thus has the contacted aqueous solution which also contains contaminants washed from the articles. This collecting reservoir is also typically used as a source reservoir for contacting contaminated articles with aqueous solution. Thus, for example, aqueous solution from the reservoir can be conducted through a sprayhead to spray contaminated articles over the top of the reservoir, and after contacting the articles, the aqueous solution is allowed to drain back into the reservoir. In such a continuous system, if contaminants are not removed from the system in some manner, the concentration of contaminants eventually builds up to an unacceptable level.

To address this concern, the present process further includes allowing contaminants in the contacted aqueous solution to separate from the aqueous solution. An important aspect of the present composition and process is the ability of the aqueous solution to allow contaminants to separate or release from the aqueous solution. This concept refers to the ability of the aqueous solution, including terpene, surfactants and water, to release contaminants which then can separate to a phase distinct from the aqueous solution of terpene, surfactant and water.

The present composition and process allow for efficient separation or release of contaminants from the aqueous terpene and surfactant solution. In this manner, the present composition and process are particularly suitable for use in a continuous cleaning process because contaminants can be efficiently separated from the aqueous solution, thus allowing reuse of the aqueous terpene and surfactant solution. Suitable release times vary depending upon the nature of specific cleaning processes and factors such as desired through-put of articles to be cleaned. However, in accordance with the present invention, suitable separation times are typically less than about five minutes, more preferably less than about 4 minutes, and more preferably less than about 3 minutes.

It should be recognized that in accordance with the present invention, even after the maximum amount of release of contaminants is achieved, some residual amount of contaminants may be contained in the aqueous terpene, surfactant and water solution which will not separate, even upon further standing. In particular, in a preferred embodiment of the present invention, the amount of residual contaminants left in the terpene, surfactant and water solution, even after complete release of contaminants, is less than about 2 volume percent based on total volume of the terpene, surfactant, water and residual contaminant solution, more preferably less than about 1.8 volume percent, and more preferably less than about 1.5 volume percent.

The step of allowing contaminants to separate from the contacted aqueous solution can be conducted either in the vessel collecting contacted aqueous solution or in a separate vessel. If conducted in a separate vessel, solution from the collection vessel is simply transferred to a separate vessel in which separation is allowed to occur. Upon separation, a distinct contaminant phase will form on top of the solution. This phase can be removed by skimming, decanting or other conventional means.

As noted above, the present process can be conducted in a continuous mode. In this embodiment, the vessel in which contaminants are allowed to separate from the contacted aqueous solution will have approximately equal rates of liquid flowing into the vessel compared to rates of liquid flowing out of the vessel to maintain an overall relatively constant volume. It should be noted, for example, in such an embodiment the inflow to the vessel would be located at approximately the separation line of the two phases and outflow from the contaminant phase would be located above the phase separation line and outflow from the aqueous solution phase would be located below the phase separation line.

Contaminants which are thus recovered from the present process can be recycled for further use in a manufacturing process. For example, such contaminants can be filtered to remove particulates. It has been found that cleaning with a terpene-based cleaning system does not degrade contaminants thus preventing recycle of contaminants as is the case with many acidic or caustic cleaning agents. Depending upon the quality of the contaminants, they can be used directly in the manufacturing process or blended with other suitable lubricants and/or coolants for further use.

The process of the present invention further includes recycling a portion of the contacted aqueous solution from which contaminants have been separated. The portion can be all or less than all of the separated aqueous solution. The separated aqueous solution which comprises terpene, surfactant, water and some residual amount of contaminant can be recycled directly to the aqueous solution to contact articles to clean contaminants therefrom. Alternatively, the aqueous solution can be further separated into streams and one or more of the streams can be recycled in the overall process.

For example, the aqueous solution from which contaminants have been separated can be further treated by filtering terpene and surfactant from the water. Such filtering techniques can include, for example, separating terpene and surfactant from water in a cross-flow filter. As used herein, cross-flow filter refers to a device which separates components in a pressurized feed stream moving parallel to a filter membrane. Such filters can be made of any suitable materials, including ceramic and polymer membranes, such as polypropylene, surface treated polypropylene, and surface treated polyacrylnitrile, and preferably is ceramic. Typically, the filter pore size of suitable filters is from about 50 Å to about 7,500 Å, more preferably from about 100 Å to about 5,000 Å, and more preferably from about 200 Å to about 1,000 Å.

The terpene and surfactant stream from such a filter process can typically be conducted directly back to the step of contacting an article with an aqueous solution. The water stream from such a filter process can be used first as clean rinse water for rinsing articles which have been cleaned with a terpene-based cleaning solution to remove residual amounts of terpene from cleaned articles. Such rinse water can optionally be subsequently introduced into an aqueous cleaning solution.

A preferred embodiment of the present process is described with reference to FIG. 1. A wash solution 10, comprising terpene, surfactant and water, is contained in a wash vessel 12. Contaminated articles (not shown) enter the system from the right and are passed underneath a wash sprayhead 14 which sprays wash solution 10 from the wash vessel 12 onto articles. Sprayed wash solution 10, with contaminants washed from the articles, then drains back into the wash vessel 12.

To prevent accumulation of contaminants in the wash solution 10 to an unacceptable level, a portion of the wash solution 10 is conducted to a separation vessel 16. In the separation vessel 16, wash solution 10, with contaminants, is allowed to separate into a contaminant phase 18 and an aqueous phase 20. The contaminant phase 18 is then separated and, if desired, can be recycled. The aqueous phase 20, which contains terpene, surfactant, water and residual contaminants, is then directed to a filter 22. The filter 22 separates the mixture into a terpene, surfactant and residual contaminant stream 24 and a water stream 26. The terpene, surfactant and residual contaminant stream 24 can be recycled back to the wash solution 10 in the wash vessel 12.

After an article is washed over the wash vessel 12, the article can be rinsed with water from the first rinse tank 28 through a first rinse sprayhead 30. The article is then conducted to be positioned over the first rinse tank 28 to be sprayed with water from the second rinse tank 32 through the second rinse sprayhead 34. The article is then conducted to be positioned over the second rinse tank 32 and sprayed with rinse water from the third rinse tank 36 through the third rinse sprayhead 38. The article is then conducted to be positioned over the third rinse tank 36 and can be sprayed with the water stream 26 from the filter 22 through the fourth rinse sprayhead 40.

It should be noted that an additional water source is typically needed to make up for water lost by evaporation and that such water can be introduced anywhere in the system, but preferably would be added to the third rinse tank 36 either through the fourth rinse sprayhead 40 or through some additional means. Further, it should be recognized that an additional rinsing step, for example, with deionized water, may be desirable after rinsing with the fourth rinse sprayhead 40.

In conjunction with the present invention, a hood, exhaust stack and stack condenser can be placed over the washing and rinsing stages described above to control the amount of volatile organic compounds released during these stages. In a preferred embodiment, terpene emissions can be captured by a hood and condensed by a stack condenser placed within an exhaust stack having a flow rate of about 250 ft$^3$/minute.

From the foregoing discussion, a number of advantages attendant to the present composition and process are apparent. Because the present composition allows for quick release of contaminants from contaminated wash solutions, a cleaning system can be conducted in a substantially continuous fashion. In addition, since the system can be continuous, a substantially closed recycling system for both washing and rinsing of contaminated articles is readily established.

The following examples are provided for the purpose of illustration and are not intended to limit the scope of the invention.

EXAMPLE I

This example illustrates the use of a composition in accordance with the present invention and the release of contaminants from a wash solution after cleaning.

A mixture of 93 volume percent d-limonene, 6 volume percent Tergitol NP-7, and 1 volume percent WRS-1-66 is diluted with water to a 10 volume percent composition to form a wash solution. An aluminum container contaminated with an oil-in-water emulsion of lubricants, comprising about 15 volume percent oil, is sprayed with the above wash solution to wash the contaminants from the container. The container is completely clean to the touch. The wash solution is collected as it is drained from the contacted container. The collected solution is allowed to settle and within five minutes a distinct organic layer is formed containing substantially only oil phase contaminants cleaned from the container. The aqueous layer contains terpene, surfactant, water and less than about 2 volume percent residual contaminants.

COMPARATIVE EXAMPLE II

The following example illustrates the use of a comparative composition to illustrate that compositions outside the scope of the present composition do not provide for adequate release of contaminants in a wash system.

A composition comprising 89 volume percent d-limonene, 10 volume percent Tergitol NP-7, and volume percent WRS-1-66 is diluted with water to make a 10 volume percent composition to form a wash solution. A contaminated aluminum container is treated as described in Example I and the resulting solution is collected as it drains from the container. Upon settling, the solution remains a uniform dispersion and does not separate into distinct phases.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A process, comprising:
   (a) contacting an article contaminated with water insoluble contaminants, such article made of a material selected from the group consisting of meal, ceramic, fiberglass, plastic and wood, with an aqueous solution comprising between about 1.86 volume percent and about 37.2 volume percent terpene and between about 0.14 volume percent and about 2.8 volume percent surfactant, based on total volume of said aqueous solution, whereby said aqueous solution is effective in removing contaminants from said article;
   (b) allowing said removed contaminants to separate from said contacted aqueous solution; and
   (c) separating said terpene from said water after removal of said contaminants in step (b);
   (d) wherein said water obtained in step (c) is capable of being used to rinse articles contacted in step (a).

2. A process, as claimed in claim 1, wherein said process is continuous.

3. A process, as claimed in claim 1, wherein said terpene is selected from the group consisting of d-limonene, alpha-terpineol, beta-terpineol, alpha-pinene, beta-pinene, alcohols of the forgoing, and mixtures thereof.

4. A process, as claimed in claim 1, wherein said terpene comprises d-limonene.

5. A process, as claimed in claim 1, wherein said surfactant comprises surfactants selected from the group consisting of nonylphenol, alkanolamide, (nonylphenoxy)polyethylene oxide, sodium salts of petroleum sulfonic acid, sorbitan sesquioleate, and mixtures thereof.

6. A process, as claimed in claim 1, wherein said surfactant comprises a mixture of a nonylphenol and an alkanolamide.

7. A process, as claimed in claim 6, wherein said nonylphenol comprises a nonylphenol with an ethoxylated seven carbon chain and said alkanolamide comprises DEA oleate and oleic acid DEA.

8. A process, as claimed in claim 1, wherein said step of allowing said contaminants to separate occurs in less than about 5 minutes.

9. A process, as claimed in claim 1, wherein said separated aqueous solution of step (b) contains less than about 2 volume percent of contaminants, based on total volume of the separated aqueous solution.

10. A process, as claimed in claim 1, wherein said contaminants comprise an oil-in-water emulsion.

11. A process, as claimed in claim 1, wherein said contaminants comprise synthetic contaminants.

12. A process, as claimed in claim 1, further comprising filtering said separated aqueous solution of step (b) to filter said terpene and surfactant from water.

13. A process, as claimed in claim 1, wherein the ratio of surfactant to terpene is less than about 9.5:90.5.

14. A process, as claimed in claim 1, wherein the article is a metal article.

15. A process, as claimed in claim 14, wherein the article is an aluminum container.

16. A continuous process for cleaning articles, comprising:
   (a) contacting an aluminum container contaminated with water insoluble contaminants with an aqueous wash solution, whereby said aqueous wash solution is effective in removing contaminants from said article;
   (b) allowing said removed contaminants to separate from said contacted aqueous wash solution for less than about 5 minutes; and
   (c) recycling a portion of said separated aqueous wash solution;
   (d) wherein said aqueous wash solution comprises:
      (i) between about 1.86 and about 37.2 volume percent terpene based on total volume of the aqueous wash solution; and
      (ii) between about 0.14 and about 2.8 volume percent surfactant based on total volume of the aqueous wash solution.

17. A process, comprising:
   a) contacting an article contaminated with water insoluble contaminants, such article made of a material selected from the group consisting of metal, ceramic, fiberglass, plastic and wood, with an aqueous solution, said solution comprising surfactant and terpene, wherein the ratio of surfactant to terpene is less than about 9.5:90.5, whereby said aqueous wash solution is effective in removing contaminants from said article;
   (b) allowing removed contaminants to separate from said contacted aqueous solution; and
   (c) separating said terpene from said water after removal of said contaminants in step (b)
   (d) wherein said water obtained in step (c) is capable of being used to rinse articles contacted in step (a).

18. A process, as claimed in claim 17, wherein said surfactant comprises a mixture of a nonylphenol and an alkanolamide.

19. A process, as claimed in claim 17, wherein said nonylphenol comprises a nonylphenol with an ethoxylated seven carbon chain and said alkanolamide comprises DEA oleate and oleic acid DEA.

* * * * *

UNITED STATES PATENT AND TRADEMARK OFFICE
CERTIFICATE OF CORRECTION

PATENT NO. : 5,271,773
DATED : December 21, 1993
INVENTOR(S) : Hamilton et al.

It is certified that error appears in the above-identified patent and that said Letters Patent is hereby corrected as shown below:

In Column 9, claim 1, line 29, please delete the word "meal" and insert -- metal -- therefor.

In Column 9, claim 3, line 51, please delete the word "forgoing" and insert -- foregoing -- therefor.

Signed and Sealed this

Twenty-eighth Day of June, 1994

Attest:

BRUCE LEHMAN

*Attesting Officer*     *Commissioner of Patents and Trademarks*